United States Patent
Güntherberg et al.

(10) Patent No.: US 6,945,687 B2
(45) Date of Patent: Sep. 20, 2005

(54) MIXING APPARATUS HAVING A COOLED CONNECTOR

(75) Inventors: Norbert Güntherberg, Speyer (DE); Jürgen Hofmann, Ludwigshafen (DE); Elmar Mailahn, Worms (DE); Hilmar Ohlig, Kaiserslautern (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 225 days.

(21) Appl. No.: 10/398,115

(22) PCT Filed: Oct. 4, 2001

(86) PCT No.: PCT/EP01/11457

§ 371 (c)(1), (2), (4) Date: Apr. 2, 2003

(87) PCT Pub. No.: WO02/28618

PCT Pub. Date: Apr. 11, 2002

(65) Prior Publication Data

US 2003/0183979 A1 Oct. 2, 2003

(30) Foreign Application Priority Data

Oct. 6, 2000 (DE) ......................................... 100 50 023

(51) Int. Cl.⁷ ................................................ B29C 7/46
(52) U.S. Cl. ...................... 366/76.3; 366/144; 425/205
(58) Field of Search ............... 366/76.3, 76.4, 366/144–149; 425/204, 205

(56) References Cited

U.S. PATENT DOCUMENTS 3,940,220 A * 2/1976 D'Arcangeli ............ 425/131.1
4,054,271 A * 10/1977 Lanzillo ..................... 366/70
4,124,307 A * 11/1978 Anisic ...................... 366/76.3
6,313,212 B1 * 11/2001 Caretta et al. .............. 524/493

OTHER PUBLICATIONS

Saechtling; Kunststoff–Taschenbuch,Hanser-Verlag, Muenchen, Wien, Ausgabe 26,1995,p. 191–246.

Patent Abst of Japan, 63207627–XP–002189169, Dec. 1988.

Patent Abst. of Japan 61095923, Sep. 1986.

* cited by examiner

*Primary Examiner*—David Sorkin
(74) *Attorney, Agent, or Firm*—Novak Druce & Quigg (57) ABSTRACT

The present invention relates to a mixing apparatus at least composed of a screw-based machine S1 and a screw-based machine S2, where S1 has heating equipment, at least in the plasticizing and homogenizing zone, and where the outlet from S2 has been connected to the screw-containing barrel of S1, within the plasticizing or homogenizing zone of S1, a substantive feature of which is that the connection between S1 and S2 is brought about by a connector which has cooling equipment effective as far as the inner wall of the screw-containing barrel of S1, and to a process for preparing thermoplastically processable molding compositions, in particular additive masterbatches, from at least one thermoplastic component C1 and at least one component C2, where the melting point or decomposition temperature $T_M^{C2}$ of C2 is lower, by at least about 50° C., than the temperature $T_H^{C1}$, which is the lower limit of the thermoforming range of C1, and where most of C2 is melted only after contact with C1.

4 Claims, 1 Drawing Sheet

Figure 1

MIXING APPARATUS HAVING A COOLED CONNECTOR

The present invention relates to a mixing apparatus at least composed of a screw-based machine S1 and a screw-based machine S2, where S1 has heating equipment, at least in the plasticizing and homogenizing zone, and where the outlet from S2 has been connected to the screw-containing barrel of S1, within the plasticizing or homogenizing zone of S1, wherein the connection between S1 and S2 takes place via a connector which has cooling equipment effective as far as the inner wall of the screw-containing barrel of S1.

The present invention further relates to the use of the mixing apparatus for preparing thermoplastically processable molding compositions, in particular what are known as additive masterbatches.

The invention also relates to a process for preparing thermoplastically processable molding compositions, in particular additive masterbatches, from at least one thermoplastic component C1 and at least one component C2, where the melting point or decomposition temperature $T_M^{C2}$ of C2 is lower, by at least about 50° C., than $T_H^{C1}$, which is the lower limit of the thermoforming range of C1, a feature being that most of C2 is melted only after contact with C1.

The invention also relates to thermoplastically processable molding compositions which can be prepared by the process of the invention, in particular additive masterbatches, to the use of these for producing films, fibers, or moldings, and also to the films, fibers, or moldings made therefrom, and to the use of additive masterbatches for preparing thermoplastically processable molding compositions.

Organic polymers, such as thermoplastics, are generally provided with additives during the course of at least one stage of processing. Examples of these additives are stabilizers to counter oxidative degradation, which may have been initiated by light or by heat, and acid scavengers which neutralize acid residues which are the result of residues of catalyst, and dyes, flame retardants, lubricants, antistats, and the like.

When thermoplastically processable polymers are mixed with additives, in order to avoid the frequently disadvantageous handling of pure additives, use is often made of what are known as additive masterbatches. These additive masterbatches are specific molding compositions which have the additives needed embedded in a matrix, such as one made from a thermoplastic polymer, but the content of additive is markedly higher than in conventional molding compositions mixed with additives. Molding compositions with conventional additive contents are then prepared by adding appropriate amounts of an additive masterbatch to a thermoplastic, for example one which has not been mixed with additives.

The processes and mixing apparatus usually suitable for preparing thermoplastically processable molding compositions mixed with additives or preparing additive masterbatches are known to the skilled worker (see Saechtling, Kunststoff-Taschenbuch, Hanser Verlag, Munich, Vienna, 26th Edition, 1995, pp. 191–246).

The additives mentioned are mostly pulverulent or liquid at room temperature. There are disadvantages associated with the use of these additives in powder form when incorporated into the thermoplastically processable component, using known mixing apparatus and processes.

For example, dusts are formed and on occasion can be hazardous to health or cause dust explosions.

Incorporation of pulverulent additives into thermoplastically processable components, in particular to prepare additive masterbatches, can also give problems in principle if the melting point of at least one additive component is well below, for example 50° C. below, the temperature which is the lower limit of the thermoforming range of the thermoplastic matrix, for example about 110° C. Even additives with a melting point of about 150° C. can generally give difficulties if the temperature which is the lower limit of the thermoforming range of the thermoplastic matrix is correspondingly high, for example about 200° C. Incorporation is particularly problematic if the melting point of an additive is lower by from about 50 to 350° C. than the processing temperature of the thermoplastically processable component. For example, incorporation is particularly difficult if the melting point of the additive is in the region of or only slightly above the ambient temperature in the processing machinery, for example from about room temperature to 60° C. The problems which can occur in these cases are: premature melting of the additive while it is still in its feed unit, one possible result of this being that it is no longer possible to achieve the build-up of pressure needed for incorporation using an extruder; agglutination and caking of the additive; non-uniform or incorrect feeding of the additive; inhomogeneous distribution of the additive in the thermoplastically processable component, for example due to major viscosity differences between thermoplastic component and an additive in the form of a low-viscosity melt; decomposition or discoloration of the additive in the solid or molten state due to excessive heating, frequently with exposure to atmospheric oxygen.

One way of incorporating these types of additive components into the thermoplastic matrix is liquid metering of the additive at a temperature above its melting point. However, this procedure requires that the additive be thermally stable above its melting point. If this stability is insufficient, decomposition of the additive and discoloration of the thermoplastically processable molding compositions are possible consequences. In addition, for liquid feeding the only feed unit which can be used is a positive-pressure pump, since it is then not possible to use an extruder, for example, to achieve the pressure build-up needed for the feeding process.

EP 565 184 A1 describes processes in which solids mixers or extruders are used to mold a number of additive components to give compact pellets, which can then be incorporated into thermoplastic polymers. These compact materials prepared purely by exerting mechanical pressure on the pulverulent components mostly have low stability to mechanical abrasion, and it is therefore not possible to eliminate the risk of dust formation. In addition, compact materials of this type tend to agglutinate and cake if they comprise low-melting components, especially in warm ambient temperatures.

Each of WO 98/13412 and EP-A 534 235 discloses a mixing apparatus composed of main and ancillary extruders and used for preparing impact-modified thermoplastics, starting from at least one water-containing component. When apparatus of this type is used for preparing additive masterbatches in which the additive used comprises at least one component whose melting point is well below the temperature which is the lower limit of the thermoforming range of the thermoplastic matrix, or whose melting point is in the region of or only slightly above the ambient temperature in the processing machinery, for example from about room temperature to 60° C., the disadvantage is that agglutination and non-uniform feeding can arise in the region where the additive is fed into the thermoplastic matrix. In these cases it is impossible to obtain a homogeneous thermoplastically processable molding composition.

It is an object of the present invention to provide an apparatus and a process which can prepare homogeneous thermoplastically processable molding compositions, in particular additive masterbatches, from at least one thermoplastic component and at least one other component, where the melting point or decomposition temperature of the other component is well below, for example about 50° C. below, the temperature which is the lower limit of the thermoforming range of the thermoplastic component, for example about 110° C., or the melting point or decomposition temperature of the other component is lower, by from about 50 to 350° C., than the processing temperature of the thermoplastic component, or the melting point or decomposition temperature of the other component is in the region of or only slightly above the ambient temperature in the processing machinery, for example from about room temperature to 60° C., and which do not give rise to the abovementioned problems.

We have found that this object is achieved by way of the mixing apparatus and process defined at the outset and described in more detail below.

The mixing apparatus of the invention is composed at least of a screw-based machine S1 and a screw-based machine S2. In principle, it is also possible for the structure of the mixing apparatus to involve more than the screw-based machines mentioned.

For the purposes of the present invention, screw-based machines are generally any of the assemblies which have screw-type or helix-type conveyor devices or have conveyor devices whose action is the same as that of these conveyor devices, and which are suitable for processing solid, plastically deformable, or liquid materials. Examples of suitable screw-based machines are screw compounders, plasticators, co-kneaders, kneader mixers, shear-roll extruders, and screw extruders. Screw extruders are preferred, and twin-screw extruders are particularly preferred. Examples of suitable screw-based machines are described in Saechtling, Kunststoff-Taschenbuch, Hanser Verlag, Munich, Vienna, 26th Edition, 1995, pp.191–246.

Screw-based machines usually have sections, known as zones, which have different functions. The various zones of screw-based machines are not necessarily identical with the individual components, such as barrel sections or screw segments, from which the screw-based machines, such as extruders, have been assembled. A zone is generally composed of a number of components. Depending on function, the individual zones may have different dimensions, such as different lengths or volumes.

Screw-based machines generally have one or more of the zones described below. However, in addition to these, screw-based machines may also have zones whose function is not explicitly described below.

For the purposes of the present invention, the feed zone is that section of a screw-based machine in which one or more components, such as a thermoplastically processable polymer, are introduced into the screw-based machine. This introduction may take place using feed equipment, for example composed of an upper opening in the screw-based machine with a hopper placed thereupon, so that the component to be fed can pass into the screw-based machine using gravity. However, the feed equipment may also be composed of a screw which conveys material, or of an extruder, for example, by way of which the component to be fed is pressed through the feed aperture of the screw-based machine. Examples of suitable extruders for feed purposes are twin-screw extruders with intermeshing counterrotating screws. Pumps are also suitable feed equipment for liquid components. Most feed equipment operates automatically. If the feed zone comprises a number of feed apertures, examples of arrangements of these are a succession along an imagined longitudinal axis of the screw-based machine, in a circle around the periphery of the screw-based machine, or along an imaginary helix around the screw-based machine.

For the purposes of the present invention, the plasticizing zone is that section of a screw-based machine in which a component is brought to a thermoformable, mostly molten or plastically deformable, state. This is generally achieved by heating or introducing mechanical energy. To introduce mechanical energy use may be made of the components familiar to the skilled worker as plasticizing elements, such as screw elements with a very small pitch value in the conveying direction, kneading blocks with narrow or wide, conveying or non-conveying kneading disks, screw elements with a pitch value operating counter to the direction of conveying, or a combination of elements of this type. The choice of the nature, number and size of the plasticizing elements in the plasticizing zone depends on the components of the polymer mixture, in particular on the viscosity, and softening point, and also on the miscibility of the components.

For the purposes of the present invention, the homogenizing zone is that section of a screw-based machine in which one or more components, of which at least one is in its thermoformable state, are homogenized. This homogenization mostly takes place by mixing, kneading, or shearing. Examples of suitable mixing, kneading, and shearing elements are the equipment described above as plasticizing elements.

For the purposes of the present invention, the metering zone is that section of a screw-based machine in which the thermoplastically processable molding composition, such as the additive masterbatch, is prepared for discharge from the screw-based machine and passed through the outlet. The metering zone is mostly composed of a screw for conveying material and of a closed barrel section terminated by a defined outlet.

The outlet used preferably comprises a die head, for example a die plate or die array, and the dies here may be circular (perforated plate), slot-shaped, or of some other shape. The product discharged as extrudate from a die plate is cooled as usual, e.g. in water, and pelletized. Diced pellets can be produced specifically if a slot die is used.

In one particular embodiment, instead of the die array described above with the usual combination of extrudate haul-off, waterbath and pelletizer, use is made of a particular die head followed by underwater pelletization. Here, the liquid or plastic material passes through a die plate with round, preferably circular holes, is separated by underwater cutting using rotating knives and is cooled under water, whereupon the material hardens to give beads with varying degrees of roundness. Commonly encountered arrangements of the holes are non-circular arrangements with non-round hole shapes.

In another embodiment, instead of discharge via a die array, waterbath cooling, and pelletization a die-phase cutting process is used, where the liquid or plastic material emerging from the die head is not cooled by a liquid but is comminuted (pelletized) while still hot after discharge from the die head after a short period of air cooling. The resultant pellets are then further cooled or cool during further processing, if this is necessary.

Additive masterbatches are preferably prepared in pellet form. If the thermoplastically processable molding composition is not an additive masterbatch but by this stage of processing comprises all of the additives in amounts suitable for the eventual application desired, it is also advantageous to carry out further processing while the material is hot, or to carry out direct extrusion of sheets, films, pipes, or profiles.

In another particular embodiment, the metering zone has an apparatus, located upstream of the die head, for filtering the liquid or plastic material emerging from the screw-based machine. Apparatus of this type for continuous melt filtration is known to the skilled worker and commercially available. If necessary, it is possible to install a conveying system between metering zone and melt filtration, for example a melt pump or a screw conveyor, in order to build up the melt pressure needed for passage through the filter unit.

The liquid or plastic material emerging from the filtration apparatus is pelletized or further processed in some other way, as described above.

Screw-based machines may comprise other zones in addition to these, for example deaerating or degassing zones for dissipating gaseous constituents, or squeeze zones or dewatering zones for removing and discharging liquid constituents, which may be water or else other materials. Degassing zones, squeeze zones and dewatering zones are described in WO 98/13412, as are the design and arrangement of the appropriate apparatus, and the publication mentioned is therefore expressly incorporated herein by way of reference in relation to these features.

A section of a screw-based machine may also combine two or more of the zones mentioned. If, for example, another material is fed into the homogenizing zone of an extruder, the homogenizing zone functions simultaneously as a feed zone. Similarly, the other zones mentioned may exist simultaneously within one section of the screw-based machine.

The individual zones may be capable of clear spatial demarcation from one another or undergo continuous transition into one another. For example, in an extruder the transition from the plasticizing zone into the homogenizing zone may not always be capable of clear spatial demarcation. There is often a continuous transition between the two zones.

As is well known, the various zones of a screw-based machine, of an extruder for example, may be individually heated or cooled in order to set an ideal temperature profile along the direction of conveying. Suitable heating and cooling equipment is known to the skilled worker. Examples which may be mentioned of heating equipment are: direct flame application, electrical heater strips, and heating jackets or heating pipes through which there is a flow of heat-transfer fluid, such as water, silicone oils, paraffins, or other organic compounds suitable for heat-transfer, inorganic molten salts, e.g. sodium nitrate/potassium nitrate mixtures, or low-melting metal alloys, or else gases, such as steam. Preference is given to electric heating and to heating jackets or heating pipes through which fluids flow.

Examples of suitable cooling equipment are: air cooling systems, Peltier elements, and cooling pipes or cooling jackets through which flow fluids suitable for heat dissipation, such as water, salt solutions, brine or low-melting-point organic compounds. Preference is given to cooling pipes or cooling jackets through which fluids flow.

The temperatures to be selected in any particular case and the spatial dimensions of the individual zones differ depending on the chemical and physical properties of the components and their quantitative ratios.

According to the invention, the screw-based machine S1 has at least one feed zone, at least one plasticizing zone, and at least one homogenizing zone.

The screw-based machine S1 has heating equipment, at least in the plasticizing and homogenizing zone. Other zones of S1, such as the feed, metering, or degassing zones, may also have heating. It is preferable for the metering zone to have heating equipment. Zones of S1 other than a plasticizing or homogenizing zone may also have cooling equipment. It is preferable for the feed zone of S1 to have cooling equipment.

The screw-based machine S2 usually has at least one feed zone. In one preferred embodiment, the feed zone of S2 has a degassing aperture.

The screw-based machine S2 may have been designed with or without heating or cooling equipment. It is preferable for one, more than one, or all of the zones of S2 to have cooling equipment.

In the mixing apparatus of the invention the outlet from S2 has been connected to the screw-containing barrel of S1, within the plasticizing or homogenizing zone of S1. The connection is preferably in the homogenizing zone of S1. It is important that the connection between S1 and S2 is brought about by a connector which has cooling equipment effective as far as the inner wall of the screw-containing barrel of S1.

For the purposes of the present invention, the screw-containing barrel is that space in the interior of the screw-based machine in which the screw elements rotate, or within which the material to be processed is transported. The inner wall of the screw-containing barrel is that wall of the casing of the screw-based machine which is in contact with the material to be processed.

The connector may be a separate component, such as a transfer piece. However, for the purposes of the invention the term "connector" also covers apparatus fixed to S1, such as flanges or screw connectors, to which S2 may be directly attached. In such cases, the connectors fixed to S1 and/or the screw-based machine S2 themselves have cooling equipment which is effective as far as the inner wall of the screw-containing barrel of S1, for example a barrel section with full or partial cooling.

The cooling equipment mentioned is also suitable for cooling the connector.

With the exception of the feed zone of S1, the temperature selected for S1 is generally markedly above the lower limit of the thermoforming range of the thermoplastically processable component to be processed in S1. This generally means that, except in the feed zone of S1, the temperature of S1 is equal to or higher than the softening point of the thermoplastic to be processed. The temperatures selected here are preferably higher than the softening point by at least 50° C., particularly preferably at least 60° C. These temperature data and those given below for screw-based machines are always based on the temperature of those parts of the screw-based machine which are in contact with the starting materials or product, for example the inner wall of the screw-containing barrel of an extruder. The upper limit of the temperature range depends on the nature of the thermoplastically processable components used, and also on that of any other optional components present. Preference is given here to temperatures which do not damage the components. The temperatures generally selected are in the range from 150 to 40° C., preferably from 160 to 350° C. The feed zone of S1 is generally held at a temperature below the melting point or softening point of the materials fed, in order to prevent formation of caked deposits in this zone.

The temperature selected for the screw-based machine S2 and/or for the connector is generally such that the discharge temperature of the components processed in S2 is sufficiently low for these components to be predominantly in solid form when discharged from S2. No external heat is therefore generally introduced to S2 here. Rather, cooling is preferably applied by the methods mentioned or by methods known per se, so that the screw-containing barrel of S2 and/or the connector are cooled below the melting point of the component to be fed, for example to room temperature.

One important property of the mixing apparatus of the invention is that the connection between S1 and S2 is brought about by a connector which has cooling equipment effective as far as the inner wall of the screw-containing barrel of S1. According to the invention, the connector is colder, by from about 50° C. to 350° C., than the inner wall of the screw-containing barrel of S1 in the region of the connecting point. For example, the temperature of the connector is not above about 60° C., preferably not above 50° C., particularly preferably not above 30° C., while the temperature of the inner wall of the screw-containing barrel of S1 in the region of the connecting point is above about 110° C., preferably above 130° C., particularly preferably above 150° C. The temperatures to be selected in any particular case depend on the components C1 and C2 to be mixed.

Another important property of the mixing apparatus of the invention is that the screw of S2 builds up a pressure in the transition from S2 to S1 sufficiently high that conveying takes place against the pressure exerted by S1. For example, along the transition from S2 to S1 the screw of S2 may be single-flighted and/or have increasingly closely spaced flights.

In one preferred embodiment, what is known as a main extruder is used as screw-based machine S1, and what is known as an ancillary extruder is used as screw-based machine S2.

Costs may be saved in building up the inventive arrangement of each of the extruders by adopting the kit principle and using commercially available extruder components. Components of this type are available in the form of what are known as "sections", screw sections of varying design with their associated barrel sections, and these permit precise matching of the extruder to the specific compounding task.

As main and/or ancillary extruder, use may be made of single-screw extruders or twin-screw extruders which are corotating and intermeshing, or else counterrotating intermeshing, or else non-intermeshing. Twin-screw extruders are preferably used as main and/or ancillary extruder. Particular preference is given to corotating, intermeshing twin-screw extruders.

In the region of the feed zones and in any deaerating or degassing zones present, the extruder screws of the main and/or ancillary extruder generally have the design of screws for normal conveying purposes. All of the zones of the ancillary extruder preferably have screws designed for normal conveying purposes. For the purposes of the present application, screws designed for normal conveying purposes are composed predominantly of elements with an "Erdmenger" profile (fully self-cleaning), of thrust-edge elements, of elements with a trapezoidal profile, of elements with a rectangular profile, or a combination of these elements. The degassing apertures of any degassing zones present may also, if necessary, have the packing screws usual in industry, but this is not generally necessary.

In one preferred embodiment, the main extruder is a screw extruder whose plasticizing and homogenizing zone has mainly kneading elements, mixing elements and shearing elements. The selection of these kneading elements, mixing elements and shearing elements depends on the rheology of the thermoplastic and other components. Suitable mixing elements, kneading elements, and shearing elements have been described above.

The main and/or ancillary extruders used may have shallow-flighted, medium-depth flighted, or deep-flighted screws ("deep-cut screws"). The flight depth of the screws to be used depends on the type of machine. The type of machine to be used in a particular case depends on the particular task.

The number of flights on the screws of the main and/or ancillary extruder may vary. For the ancillary extruder, in the transition to the main extruder, it is preferable to use single-flighted screws. Otherwise, it is preferable to use double-flighted screws. However, it-is also possible to use screws with other numbers of flights, for example single-flighted or triple-flighted screws, or else screws which have sections with different numbers of flights.

The screw rotation rates for the main and/or ancillary extruder may vary over a wide range. Preference is given to using relatively high rotation rates. Suitable rotation rates for the screws of the main and/or ancillary extruder are, independently of one another, in the range from 50 to 1200 rpm, preferably from 100 to 1000 rpm, particularly preferably from 400 to 900 rpm.

In one preferred embodiment, the mixing apparatus of the invention is composed of one main extruder and of one ancillary extruder, the main extruder having a feed zone cooled to about room temperature by water cooling and having plasticizing, homogenizing, and metering zones heated to 150–400° C. and being equipped with twin screws corotating at from 50 to 1200 rpm. The twin screws of the main extruder are of double-flighted design and have normal-conveying elements in the feed and metering zones, and mixing, kneading, and/or shearing elements in the plasticizing and homogenizing zones. In the region of the homogenizing zone of the main extruder there is preferably an ancillary extruder, attached via its outlet to the screw-containing barrel of the main extruder. The connection of the ancillary extruder to the main extruder takes place via a transfer piece which has water cooling effective as far as the inner wall of the screw-containing barrel of the main extruder, so that in the region of the connecting point to the main extruder the transfer piece is colder, by from 50 to 350° C., than the inner wall of the screw-containing barrel of the main extruder in the region of the connecting point. The ancillary extruder is preferably fully water-cooled, for example to room temperature. The ancillary extruder has advantageously been equipped with twin screws corotating at from 50 to 1200 rpm, which build up a pressure sufficiently high in the transition from ancillary extruder to main extruder that conveying takes place against the melt pressure exerted by the main extruder. It is preferable for the twin screws of the ancillary extruder to be of single-flighted design in the transition to the main extruder and of double-flighted design in the other regions, and to have normal-conveying screw elements.

DETAILED DESCRIPTION OF THE DRAWING(S)

Figure 1:
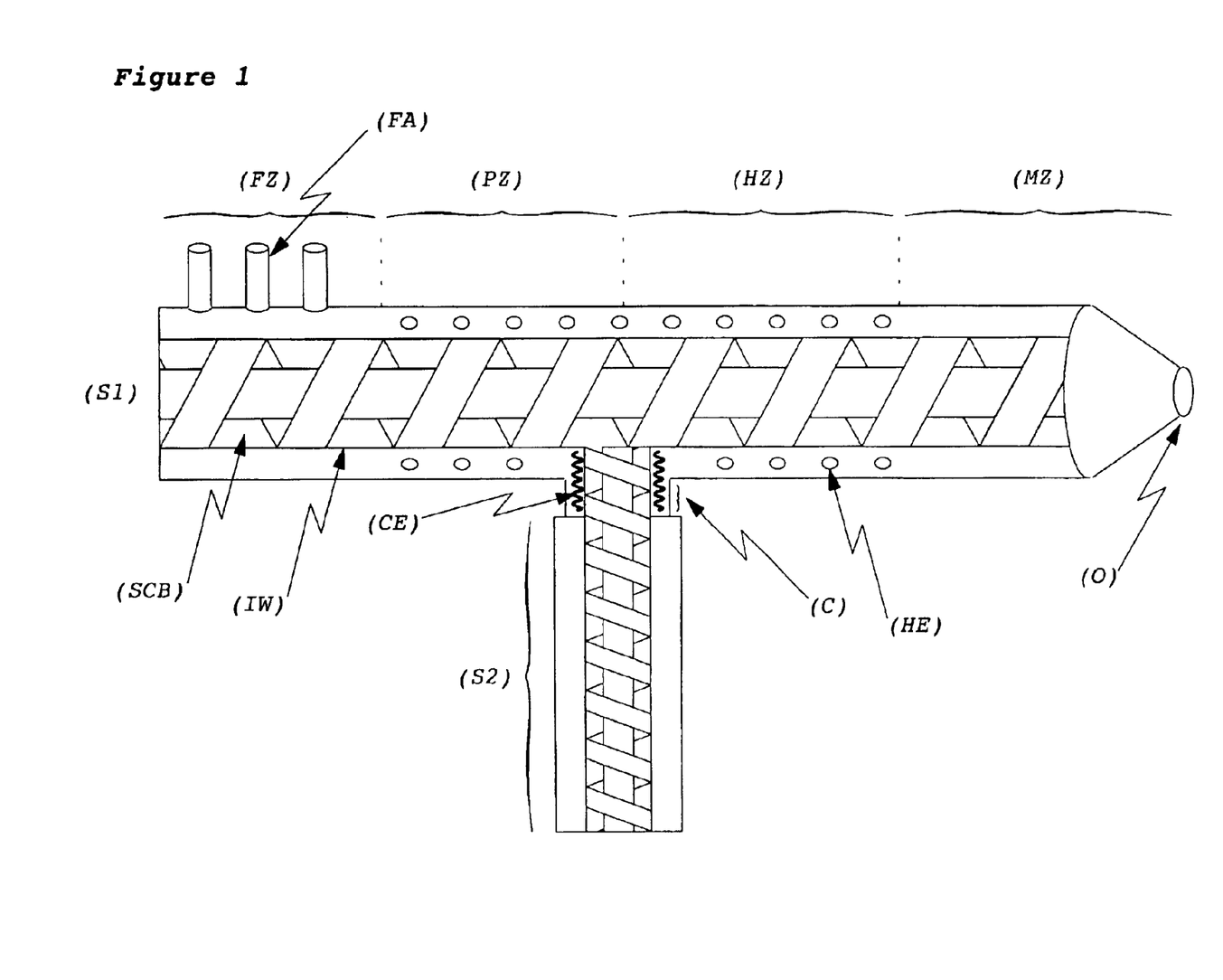
FIG. 1 is a schematic illustration of the mixing apparatus of the invention.

FIG. 1 illustrates the set-up of the the mixing apparatus of the invention. The first screw-based machine (S1) has a screw-containing barrel (SCB) surrounded by an inner wall (IW), and comprises a feed zone (FZ) which is equipped with feed apertures (FA), a plasticizing zone (PZ), a homogenizing zone (HZ), a metering zone (MZ) and an outlet (O). The plasticizing zone (PZ) and the homogenizing zone (HZ) of the first screw-based machine (S1) are provided with heating equipment (HE). The second screw-based machine (S2) is connected to the screw-containing barrel (SCB) of the first screw-containing machine (S1) within the plasticizing zone (PZ) or the homogenizing zone (HZ). The connection between the second screw-based machine (S2) and the screw-containing barrel (SCB) of the first screw-containing machine (S1) takes place via a connector (C) which is provided with cooling equipment (CE) which is effective as far as the inner wall (IW) of the screw-containing barrel (SCB) of the first screw-based machine (S1).

The mixing apparatus of the invention is suitable for preparing thermoplastically processable molding compositions, in particular those known as additive masterbatches. They are particularly well suited for preparing thermoplastically processable molding compositions, in particular additive masterbatches, from at least one thermoplastic component C1 and at least one component C2, where the melting point or decomposition temperature $T_M^{C2}$ of component C2 is well below, for example about 50° C. below, the temperature $T_H^{C1}$, which is the lower limit of the thermoforming range of the thermoplastic component, for example about 110° C., or where $T_M^{C2}$ is lower, by from about 50 to 350° C., than the processing temperature of C1, or where $T_M^{C2}$ is in the region of or only slightly above the ambient temperature in the processing machinery, for example from about room temperature to 60° C.

The process of the invention for preparing thermoplastically processable molding compositions, in particular additive masterbatches, from at least one thermoplastic component C1 and at least one component C2 is described below, where the melting point or decomposition temperature $T_M^{C2}$ of component C2 is well below, for example about 50° C. below, the temperature $T_H^{C1}$, which is the lower limit of the thermoforming range of the thermoplastic component, for example about 110° C., or where $T_M^{C2}$ is lower, by from about 50 to 350° C., than the processing temperature of C1, or where $T_M^{C2}$ is in the region of or only slightly above the ambient temperature in the processing machinery, for example from about room temperature to 60° C. In the process of the invention, C1 is heated to a temperature above $T_H^{C1}$, component C2 is fed in by way of a feed unit which is cooled to a temperature below $T_M^{C2}$, mixing of components C1 and C2 takes place, and the resultant thermoplastically processable molding composition or the additive masterbatch is again cooled to below $T_H^{C1}$ after an optional shaping process, the substantive feature here being that most of C2 is melted only after contact with C1.

In principle, any thermoplastically processable material is suitable as thermoplastic component C1.

Examples which may be mentioned are amorphous or semicrystalline thermoplastic polymers, including polyolefins, such as low-density or high-density polyethylene, polypropylene, polyolefin copolymers, polyolefin block polymers, polyolefin waxes, polycarbonates, polyalkylene terephthalates, e.g. polybutylene terephthalate and polyethylene terephthalate, biodegradable polymers, e.g. polylactide, polycaprolactone, or aliphatic-aromatic copolyesters made from terephthalic acid, adipic acid, and butanediol, for example, polyoxymethylene, polymethylmethacrylate, polyphenylenesulfide, polysulfones, polyether sulfones, polyketones, and polyamides, and also mixtures of these thermoplastics. Other materials which may be used as component C1 are thermoplastic elastomers, such as thermoplastic polyurethane (TPU).

Amorphous polymers are generally preferred. Examples which may be mentioned are: polymethyl methacrylate; copolymers made from methyl methacrylate and homologous $C_2$–$C_8$-alkyl esters of (meth)acrylic acid; copolymers made from styrene and acrylonitrile (SAN polymers), or else from styrene and methyl methacrylate, maleic anhydride, α-methylstyrene, ring-alkylated or ring-chlorinated styrenes, and also butadiene, for example styrene-butadiene copolymers and styrene-butadiene block copolymers; polystyrene; polyvinyl chloride; copolymers of vinyl chloride with vinylidene chloride, propylene and vinyl esters; preference is given to polymethyl methacrylate and SAN polymers, and also polystyrene and the related copolymers.

Other polymers which may be used as component C1 are copolymers based on styrene/maleic anhydride, styrene/imidated maleic anhydride, styrene/maleic anhydride/imidated maleic anhydride, styrene/methyl methacrylate/imidated maleic anhydride, styrene/methyl methacrylate, styrene/methyl methacrylate/maleic anhydride, methyl methacrylate/imidated maleic anhydride, styrene/imidated methyl methacrylate, imidated polymethyl methacrylate, and mixtures of these polymers.

In all of the thermoplastic components C1 mentioned, some or all of the styrene may have been replaced by α-methylstyrene, or by ring-alkylated styrenes, or by acrylonitrile. Among the last named components C1, preference is given to those based on α-methylstyrene/acrylonitrile, styrene/maleic anhydride, or styrene/methyl methacrylate, and to copolymers with imidated maleic anhydride.

C1 may also be a mixture of a number of thermoplastically processable materials. C1 may also be a mixture made from at least one thermoplastically processable material and from one or more materials which are not per se thermoplastically processable, as long as the mixture of all of these materials is thermoplastically processable.

Examples of components C1 used as polymeric binders in preparing pharmaceutical products, plant treatment products, feeds, and/or nutrients by melt extrusion are polymers, copolymers, cellulose derivatives, sucrose, starch, starch derivatives, modified starch, or mixtures made from the groups of materials mentioned, such as polyvinylpyrrolidone (PVP), copolymers of N-vinylpyrrolidone (NVP) and vinyl acetate or vinyl propionate, copolymers of vinyl acetate and crotonic acid, partially hydrolyzed polyvinyl acetate, polyvinyl alcohol, polyhydroxyalkyl acrylates, polyhydroxyalkyl methacrylates, polyacrylates and polymethacrylates (Eudragit grades), copolymers of methyl methacrylate and acrylic acid, polyacrylamides, polyethylene glycols, polyvinylformamide (where appropriate partially or completely hydrolyzed), water-swellable polyurethanes with a glass transition temperature Tg>20° C., cellulose esters, cellulose ethers, in particular methylcellulose and ethylcellulose, hydroxyalkylcelluloses, in particular hydroxypropylcellulose, hydroxyalkylalkylcelluloses, in particular hydroxypropylethylcellulose, cellulose phthalates, in particular celluloseacetate phthalate and hydroxypropylmethylcellulose phthalate, and mannans, in particular galactomannans. Among these, particular preference is given to polyvinylpyrrolidone, copolymers of N-vinylpyrrolidone and vinyl esters, polyhydroxyalkyl acrylates, polyhydroxyalkyl methacrylates, polyacrylates, polymethacrylates, alkylcelluloses, and hydroxyalkylcelluloses.

The polymeric binder softens or melts within the overall mixture of all of the components, usually at below 180° C., preferably at below 130° C., and the mixture thus formed is plastic. The softening or melting point is lowered if necessary by means of conventional plasticizing auxiliaries, such as those pharmacologically acceptable. Examples of substances incorporated into this component C1 which acts as polymeric binder are low-melting-point or heat-sensitive active ingredients, such as pharmaceutical active ingredients, enzymes, or vitamins.

The preparation of the components C1 mentioned is known to the skilled worker or may be carried out by methods known per se.

What is called the thermoforming range of a thermoplastic material is the temperature range within which it can be processed thermoplastically. In the ideal case a precisely defined temperature can be given for the lower limit of the thermoforming range (for example the melting point of a compound). However, it is mostly impossible to characterize the thermoforming range by way of precisely defined temperature limits. Rather, an example of what is found is that on heating a thermoplastic continuous transition is observed from the solid state into the plastic state, i.e. the state in which the material can be thermoformed. For the purposes of the invention, $T_H^{C1}$, which is the lower limit of the thermoforming range of C1, is the temperature at which, or the temperature range within which, the transition takes place from, for example, the non-thermoformable solid into the region where the material is plastic and thermoformable. The upper temperature limit of the thermoforming range of a thermoplastic material is mostly given by the highest temperature at which no significant decomposition, degradation, discoloration, or the like is observed. Here again, it is mostly impossible to give a precise temperature. Rather, there are temperature ranges within which thermoforming is just still possible, for example depending on the mechanical stress or processing time, without any adverse effects due to temperature being observed.

For example, $T_H^{C1}$ for semicrystalline thermoplastics is in the vicinity of the melting point of the crystallites. An example here is the melting point of the crystallites of high-density polyethylene at from about 130 to 146° C., the thermoforming range for high-density polyethylene usually being in the range from about 120 to 300° C. Reference may be made to Franck/Biederbick, Kunststoff-Kompendium, Vogel Buchverlag Würzburg, 2nd Edition, 1988, pp. 252–256 for further examples of this type.

In the case of amorphous thermoplastics, $T_H^{C1}$ is generally a little higher than the glass transition temperature Tg. For example, the glass transition temperature of styrene-acrylonitrile copolymers (SAN) is about 106° C., and the thermoforming range for SAN is usually the range from about 110 to >300° C. Reference may be made to Franck/Biederbick, Kunststoff-Kompendium, Vogel Buchverlag Würzburg, 2nd Edition, 1988, pp. 263–266 for further examples of this type.

Examples of suitable components C2 are those conventional additives and auxiliaries used in polymer processing whose $T_M^{C2}$ is well below, for example about 50° C. below, the temperature $T_H^{C1}$ which is the lower limit of the thermoforming range of the thermoplastic component, for example about 110° C., or whose temperature $T_M^{C2}$ is lower, by from about 50 to 350° C., than the processing temperature of C1, or whose temperature $T_M^{C2}$ is in the region of or only slightly above the ambient temperature in the processing machinery, for example from about room temperature to 60° C. Mixtures of a number of these materials are also suitable.

Examples of compounds suitable as component C2 are those which belong to the following classes:

primary antioxidants, such as sterically hindered phenols;
secondary antioxidants, such as phosphites, phosphonites, thioesters;
organic or inorganic acid scavengers;
light-stabilizer additives, such as UV absorbers and sterically hindered amines.

Examples of commonly used primary antioxidants are sterically hindered phenols, such as tetrakis[3-(3,5-di-tert-butyl-4-hydroxyphenyl)propionyloxymethyl]methane, either in amorphous form or else in crystalline form, octadecyl 3-(3',5'-di-tert-butyl-4'-hydroxyphenyl)propionate, 1,3,5-tris(3,5-di-tert-butyl-4-hydroxybenzyl)isocyanurate, [1,3,5-trimethyl-2,4,6-tris(3,5-di-tert-butyl-4-hydroxybenzyl)-benzene, and butylated reaction products made from p-cresol and dicyclopentadiene.

An example of amorphous tetrakis[3-(3,5-di-tert-butyl-4-hydroxyphenyl)propionyloxy-methyl]methane which may be mentioned is the product from EniChem Synthesis with the trade name Anox 20 AM.

An example of crystalline tetrakis[3-(3,5-di-tert-butyl-4-hydroxyphenyl)propionyloxy-methyl]methane which may be mentioned is the product from EniChem Synthesis with the trade name Anox 20 or Irganox 1010 from Ciba-Geigy.

An example of an octadecyl 3-(3',5'-di-tert-butyl-4'-hydroxyphenyl)propionate which may be used is the product Anox PP18 marketed by EniChem Synthesis, or Irganox 1076 from Ciba-Geigy.

An example of a 1,3,5-tris(3,5-di-tert-butyl-4-hydroxybenzyl) isocyanurate which may be used is the product Anox 1C-14 marketed by EniChem Synthesis.

An example of a 1,3,5-trimethyl-2,4,6-tris(3,5-di-tert-butyl-4-hydroxybenzyl)-benzene which can be used is Irganox 1330 from Ciba-Geigy.

An example of a butylated reaction product made from p-cresol and dicyclopentadiene with an average molar mass of from 600 to 700 g/mol which may be used is Wingstay L from Goodyear Tire & Rubber Company.

Examples of frequently used secondary antioxidants are tris(2,4-di-tert-butylphenyl) phosphite, bis(2,4-di-tert-butylphenyl) pentaerythrityl diphosphite, and tetrakis(2,4-di-tert-butylphenyl) 4,4'-biphenylylenediphosphonite.

An example of a tris(2,4-di-tert-butylphenyl) phosphite which may be used is the product Alkanox 240 marketed by EniChem Synthesis or Irgafos 168 from Ciba-Geigy.

An example of a bis(2,4-di-tert-butylphenyl) pentaerythrityl diphosphite which may be used is the product Ultranox 626 marketed by General Electric.

An example of a tetrakis(2,4-di-tert-butylphenyl) 4,4'-biphenylylenediphosphonite which may be used is the product Sandostab PEPQ marketed by Sandoz.

Examples of frequently used thioesters are dilauryl 3,3'-thiodipropionate (Irganox PS 800 from Ciba-Geigy) and distearyl thiodipropionate (DSTP, Irganox PS 802 from Ciba-Geigy).

Examples of frequently used acid scavengers are stearates, in particular of calcium, of zinc, of magnesium, or of aluminum; oxides, in particular zinc oxide, magnesium oxide, or titanium oxide; synthetic or naturally occurring carbonates, such as calcium carbonate, and hydrotalcite.

The compounds mentioned are known to the skilled worker and are freely marketed. Hydrotalcite, which has the formula $Mg_6Al_2(OH)_{16}(CO_3).4H_2O$, can be purchased from Kyowa with the tradename DHT4A for example.

Examples of frequently used light-stabilizing additives are 2-(2'-hydroxy-3'-tert-butyl-5'-methylphenyl)-5-chlorobenzo-triazole and 2-hydroxy-4-octyloxybenzophenone.

An example of a 2-(2'-hydroxy-3'-tert-butyl-5'-methylphenyl)-5-chlorobenzo-triazole which may be used is Uvazol 236 from EniChem Synthesis or Tinuvin 326 from Ciba-Geigy.

A 2-hydroxy-4-octyloxybenzophenone which may be used is Chimassorb 81 from Ciba-Geigy.

Other frequently used light-stabilizing additives are sterically hindered additives, such as bis(2,2,6,6-tetramethyl-4-piperidyl) sebacate and poly(N-β-hydroxyethyl-2,2,6,6-tetramethyl-4-hydroxypiperidyl succinate).

A bis(2,2,6,6-tetramethyl-4-piperidyl) sebacate which may be used is Uvaseb 770 from EniChem Synthesis or Tinuvin 770 from Ciba-Geigy.

A poly(N-β-hydroxyethyl-2,2,6,6-tetramethyl-4-hydroxypiperidyl-succinate) which may used is Tinuvin 622 from Ciba-Geigy.

However, C2 may also be waxes, oligomers, or polymers, for example ethylene-propylene-diene monomer (EPDM) rubbers or styrene-butadiene block copolymers, as long as their $T_M^{C2}$ is well below, for example about 50° C. below, $T_H^{C1}$, which is the lower limit of the thermoforming range of the thermoplastic component, for example about 110° C., or their $T_M^{C2}$ is lower, by from about 50 to 350° C., than the processing temperature of C1, or their $T_M^{C2}$ is in the region of or only slightly above the ambient temperature in the processing machinery, for example from about room temperature to 60° C.

Other examples of C2 are low-melting-point or heat-sensitive active ingredients, for example pharmaceutical active ingredients, enzymes, or vitamins. These may, for example, be incorporated into the component C1 described above and acting as polymeric binder and be further processed by melt extrusion to give tablets or similar administration forms.

The components C2 mentioned generally have a defined melting point $T_M^{C2}$. However, especially if C2 is a mixture of a number of materials, it is also possible that instead of a defined melting point there is a temperature range within which, when C2 is heated, a transition takes place from the solid phase into a liquid, plastic, deformable, viscous or flowable phase. For the purposes of the present invention, in such cases $T_M^{C2}$ is the temperature range within which the transition mentioned takes place. For mixtures of various materials, $T_M^{C2}$ often corresponds to the melting point of the lowest-melting compound.

It is also possible that $T_M^{C2}$ is not the melting point of component C2 but the temperature at which component C2 has begun to decompose sufficiently for its function to the impaired, for example in the case of pharmaceutical active ingredients, or for the quality of the inventive additive masterbatches or thermoplastically processable molding compositions to be adversely affected, for example by discoloration.

The process of the invention for preparing thermoplastic molding compositions may generally use from 80 to 99.99% by weight of C1 and from 0.01 to 20% by weight of C2, preferably from 90 to 99.99% by weight of C1 and from 0.01 to 10% by weight of C2, particularly preferably from 95 to 99.9% by weight of C1 and from 0.1 to 5% by weight of C2, and in particular from 97 to 99.9% by weight of C1 and from 0.1 to 3% by weight of C2, all of the percentages by weight being based on the total weight of C1 and C2.

If the process of the invention is used for preparing additive masterbatches, the contents of C2 are generally markedly higher. For preparing additive masterbatches use is usually made of from 30 to 99% by weight of C1 and from 1 to 70% by weight of C2, preferably from 40 to 99% by weight of C1 and from 1 to 60% by weight of C2, particularly preferably from 50 to 98% by weight of C1 and from 2 to 50% by weight of C2, and in particular from 55 to 95% by weight of C1 and from 5 to 45% by weight of C2, all of the percentages by weight being based on the total weight of C1 and C2.

In the process of the invention, furthermore, and preferably in the process of the invention for preparing thermoplastic molding compositions, components C1 and/or C2 in the processing of the polymer may comprise conventional additives and auxiliaries, and also elastomers, for example impact modifiers, which do not fall within the definition of C2. Additive masterbatches generally do not have other additives which do not fall within the definition of C2, and this is mostly unnecessary since when a thermoplastic molding composition is prepared with the use of additive masterbatches any additives desired can be incorporated, where appropriate, during this processing step. For this reason, the only instances where additive masterbatches themselves will comprise other additives which do not fall within the definition of C2 are, for example, if the additive masterbatches themselves require stabilizing with respect to UV light or heat, for example.

In the thermoplastic molding compositions prepared by the process of the invention, the proportion of additives and auxiliaries which do not fall within the definition of C2, based on the entirety of all of the materials used, is generally from 0 to 60% by weight, preferably up to 30% by weight. The actual amount used of additives or auxiliaries in each particular case depends greatly on the nature and function of the additive or auxiliary.

Examples of usual additives and auxiliaries which do not fall within the definition of C2 are stabilizers and oxidation retarders, agents to counter thermal decomposition or decomposition due to ultraviolet light, lubricants, mold-release agents, dyes, pigments, plasticizers, antistats, flame retardants, and also fibrous or particulate fillers and fibrous or particulate reinforcing materials, the melting point $T_M$ of which is not lower than $T_H^{C1}$ to the extent specified in the definition of C2. Examples of some of these additives and auxiliaries are given below.

Examples of oxidation retarders and heat stabilizers which may be added in the process of the invention, preferably for preparing thermoplastically processable molding compositions, are sterically hindered phenols, hydroquinones, phosphites, and derivatives and substituted representatives of this group, and mixtures of these compounds, preferably in amounts of up to 5% by weight, based on the total weight of all of the components in the molding compositions of the invention.

Examples of UV stabilizers are substituted resorcinols, salicylates, benzotriazoles and benzophenones, and these can generally be used in amounts of up to 1% by weight, based on the total weight of all of the components of the molding compositions of the invention. Examples of lubricants and mold-release agents, which may generally be added to the polymers at up to 1% by weight, based on the total weight of all of the components in the molding compositions of the invention, are stearic acid, stearyl alcohol, alkyl stearates, and stearamides, and also esters of pentaerythritol with long-chain fatty acids. Suitable dyes are organic dyes, such as anthraquinone red, organic pigments and lakes, such as phthalocyanine blue, and inorganic pigments, such as titanium dioxide and cadmium sulfide. Plasticizers which may be mentioned are dioctyl phthalate, dibenzyl phthalate, and butyl benzyl phthalate.

Flame retardants which may be used are the usual preparations or combinations of these, such as red phosphorus, phosphorus compounds, such as phosphoric esters, phosphorous esters, phosphonic esters, and phosphinic esters, and also tertiary phosphines and phosphine oxides, such as triphenylphosphine oxide, halogenated organic or inorganic compounds, such as tetrabromobisphenol A polycarbonate, metal oxides, such as antimony trioxide, fluorine compounds, such as polytetrafluoroethylene, or else other flame retardants known per se.

Examples which may be mentioned of reinforcing fillers are potassium titanate whiskers, carbon fibers, and preferably glass fibers. The glass fibers used may be made from E, A, or C glass, and preferably have been sized and provided with a coupling agent. Their diameter is generally from 5 to 100 $\mu$m, preferably from 6 to 20 $\mu$m. The average length of the fibrous fillers after their incorporation is preferably from 0.05 to 10 mm, in particular from 0.1 to 6 mm, and particularly preferably from 0.3 to 6 mm. However, it is also possible to use continuous-filament fibers (rovings).

Examples of other suitable fillers are glass beads, wollastonite, calcium carbonate, powdered quartz, silicon nitride, boron nitride, mineral fibers, aluminum oxide fibers, and mica. Mention may also be made of metal flakes (e.g. K 102 aluminum flakes from Transmet Corp.), metal powders, metal fibers, metal-coated fillers (e.g. nickel-coated glass fibers) and also other additives which can act as screens to exclude electromagnetic radiation, preferably K 102 aluminum flakes from Transmet Corp. Particular preference is given to mixtures selected from the group consisting of aluminum flakes, carbon fibers, conductivity black, and nickel-coated C glass fibers.

Examples of impact modifiers which may be used are flexible polymers, such as natural rubber, polybutadiene, ethylene-propylene rubbers, polyorganosiloxanes ("silicone rubbers"), polyisoprene, copolymers made from butadiene, styrene and acrylonitrile, polyethyl acrylate, polybutyl acrylate, polyethylhexyl acrylate, and also copolymers of acrylates with butadiene or of acrylates, styrene, acrylonitrile and vinyl ethers.

Preparation of impact modifiers of this type is known to the skilled worker.

The proportion of impact modifiers, based on the total weight of all of the components of the molding compositions of the invention, is generally selected within the range from 5 to 95% by weight, preferably from 10 to 50% by weight.

Depending on the choice of component C1, i.e. depending on the $T_H^{C1}$ of the thermoplastic component used in a particular case, any particular additive may fall either within or outside the definition of C2 (for example if the additive has a melting point of 60° C. and C1 has a softening point of 150° C., and, respectively, when the same additive has a melting point of 60° C. and C1 has a softening point of 70° C.).

The process of the invention can prepare thermoplastically processable molding compositions, in particular additive masterbatches, from C1 and C2 where $T_M^{C2}$ is well below, for example about 50° C. below, the temperature $T_H^{C1}$; which is the lower limit of the thermoforming range of the thermoplastic component, for example about 110° C., or where $T_M^{C2}$ is lower, by from about 50 to 350° C., than the processing temperature of C1, or where $T_M^{C2}$ is in the region of or only slightly above the ambient temperature in the processing machinery, for example from about room temperature to 60° C.

According to the process of the invention C1 is heated to a temperature above $T_H^{C1}$, component C2 is fed in by way of a feed unit which is cooled to a temperature below $T_M^{C2}$, mixing of components C1 and C2 takes place and the resultant thermoplastically processable molding composition or the additive masterbatch is again cooled to below $T_H^{C1}$ after an optional shaping process, a substantive feature being that most of C2 is melted only after contact with C1.

A suitable feed unit and cooling apparatus for C2 and also suitable mixing apparatus and shaping apparatus for the molding compositions made from C1 and C2 have been mentioned above under the description of the mixing apparatus of the invention.

In one preferred embodiment of the process of the invention, the thermoplastically processable molding compositions or the additive masterbatches made from C1 and C2 are prepared using the inventive mixing apparatus described.

Particular preference is given to a process in which component C1 is brought to a plastically deformable or molten form in a screw-based machine S1 and the screw-based machine S2 is used to feed component C2 in predominantly solid form into the plastically deformable or liquid component C1. S1 here carries out the mixing of the components, followed by an optional shaping process as described. Possible embodiments of the screw-based machines have been described.

In a preferred process of the invention, C1 is fed into the feed zone of a main extruder, the main extruder having a feed zone cooled to about room temperature by water cooling and having plasticizing, homogenizing, and metering zones heated to 150–400° C., and being equipped with twin screws corotating at from 50 to 1200 rpm The twin screws of the main extruder are of double-flighted design and have normal-conveying elements in the feed and metering zones, and mixing, kneading, or shearing elements in the plasticizing and homogenizing zones. In the region of the homogenizing zone of the main extruder there is preferably an ancillary extruder, attached via its outlet to the screw-containing barrel of the main extruder. C2 is fed into the feed zone of the ancillary extruder. The connection of the ancillary extruder to the main extruder takes place via a transfer piece which has water cooling effective as far as the inner wall of the screw-containing barrel of the main extruder, so that the transfer piece is colder, by from 50 to 350° C., than the inner wall of the screw-containing barrel of the main extruder in the region of the connecting point, i.e. the transfer piece is sufficiently cold that most of C2 melts only after contact with C1. The ancillary extruder is preferably fully water-cooled, for example to room temperature. The ancillary extruder has advantageously been equipped with twin screws corotating at from 50 to 1200 rpm. It is preferable for the twin screws of the ancillary extruder to be of single-flighted design in the transition from the main extruder and of double-flighted design in the other regions, and to have normal-conveying screw elements, so that, in the transition from the ancillary extruder to the main extruder the pressure built up is sufficiently high that conveying takes place against the pressure exerted by the main extruder. The execution of the process is such that C2 is substantively in solid form when introduced into the molten or softened component C1, i.e. most of C2 melts or softens only after contact with C1. After mixing of components C1 and C2, the thermoplastically processable molding composition is discharged through the outlet of the main extruder, where appropriate subjected to a shaping process, is preferably pelletized, and is cooled.

Other materials which may be added to components C1 and/or C2, or fed separately, in one modification of these embodiments are the conventional polymer-processing additives or auxiliaries mentioned or, for example, elastomers, which do not fall within the definition of C2. It is also possible for C1 and C2 to be added at more than one feed point, as set out in the description of the mixing apparatus of the invention.

The process of the invention is preferably used to prepare additive masterbatches.

In this case, the polymer matrix C1 and the thermoplastic to receive the additives are usually composed of the same material or are at least mutually compatible. For example, stabilizers C2 for stabilizing acrylonitrile-butadiene-styrene (ABS) copolymers, acrylate-styrene-acrylonitrile (ASA) copolymers, or styrene-acrylonitrile copolymers (SAN) can usefully be incorporated in SAN copolymer. If polystyrene (PS) or blends thereof are to be provided with additives, PS is a suitable polymer matrix C1 for the additive masterbatch.

The proportion by weight of the additives in the additive masterbatches depends on the nature of the materials and on the desired application. For example, in the case of pigments it may be up to 60% by weight, based on the total of the weights of polymer matrix C1 and additive. If low-melting-point additives C2 are used, in particular additives whose melting point is only slightly above room temperature, the proportion by weight of these additives C2 in the additive masterbatch is mostly up to 40% by weight, based on the total of the weights of polymer matrix C1 and additive C2. The proportion by weight of C2 mostly depends on the incorporative capability of the matrix material C1: the resultant additive masterbatch must be capable of further processing.

The inventive mixing apparatus and/or process can prepare homogeneous thermoplastically processable molding compositions, in particular additive masterbatches, from at least one thermoplastic component C1 and at least one other component C2, where the melting point or decomposition temperature $T_M^{C2}$ of the other component is well below, for example about 50° C. below, the temperature $T_H^{C1}$, which is the lower limit of the thermoforming range of the thermoplastic component, for example about 110° C., or where $T_M^{C2}$ is lower, by from about 50 to 350° C., than the processing temperature of C1, or where $T_M^{C2}$ is in the region of or only slightly above the ambient temperature in the processing machinery, for example from about room temperature to 60° C., without any problems caused by premature melting of C2 and relating to agglutination or caking during feeding, relating to the pressure build-up needed for the feeding of C2, relating to the mixing of the individual components, or relating to decomposition or discoloration of C2, and without any occurrence of inhomogeneity in the inventive thermoplastically processable molding compositions, in particular the additive masterbatches.

The additive masterbatches of the invention are highly suitable for the provision of additives, and therefore for preparing homogeneous thermoplastically processable molding compositions.

The films, fibers, or moldings produced using the molding compositions of the invention and/or using the additive masterbatches of the invention have very good homogeneity.

EXAMPLES

Test Methods:

The viscosity number (VN [ml/g]) of the SAN was determined to DIN 53 726 on a 0.5% strength by weight solution in dimethylformamide at 25° C.

The flowability (MVI [ml/10 min]) of the SAN was determined to ISO 1133 B at 220° C. with a load of 10 kg.

The melting points of the additives were determined using DSC measurements at a heating rate and, respectively, cooling rate of 20 K/min, during the first cooling cycle (Compound A3) or taken from manufacturer's information (Compound A2).

Starting Materials:

Component C1:

A1) SAN made from 73% by weight of styrene and 27% by weight of acrylonitrile, with a viscosity number VN of 65 ml/g and a flowability MVR of 52 ml/10 min. $T_H^{C1}$ for this polymer is about 130° C. and the usual processing temperature for this polymer is about 160–300° C.

Component C2:

A2) Dilauryl 3,3'-thiodipropionate (Irganox PS 800 from Ciba-Geigy) with a melting range of 38–40° C.

Other Additive:

A3) 1,1,3-Tris(2'-methyl-4'-hydroxy-5'-tert-butylphenyl) butane (Lowinox Calif. from Great Lakes Inc.) with a melting point of 181° C.

Mixing Apparatus:

Main Extruder E1)

A ZSK 40 twin-screw extruder from Werner and Pfleiderer was used, composed of 8 barrel sections (the numbering of the barrel sections begins with 1 at the feed zone and continues in the direction of conveying to 8 at the metering zone), and of an associated pair of screws. The external diameter of the screws was 40 mm, and the length of each barrel section was 140 mm. A1 and A3 were fed into barrel section 1, which was water-cooled to about 28° C. and had an upper feed aperture. Barrel sections 2 to 8 were heated to 160–180° C. Barrel section 4 had a lateral aperture for attaching an ancillary extruder E2). The screws had neutral-conveying elements in barrel sections 1 and 2, neutral-conveying elements and kneading blocks in barrel section 3, and toothed mixing elements and conveying and non-conveying kneading blocks in barrel sections 4 to 8. The rotation rate of the corotating twin screws, which were of double-flighted design, was 440 rpm. Discharge took place via a die plate.

Ancillary Extruder B2)

A ZSK 25 twin-screw extruder from Werner and Pfleiderer was used, composed of 6 barrel sections (the numbering of the barrel sections begins with 1 at the deaerating zone and continues in the direction of conveying to 6 at the connection to the main extruder), and of an associated pair of screws. The external diameter of the screws was 25 mm, and the length of each barrel section was 100 mm. Barrel sections 1 to 6 were water-cooled to about 28° C. Barrel section 1 had an upper deaeration aperture. Attached to the side of barrel section 2 was a twin-screw feed system for A2. Barrel section 6 opened into a transfer piece, water-cooled to 28° C. This transfer piece was attached to barrel section 4 of the main extruder E1). The screws of the ancillary extruder had neutral-conveying elements in all of the barrel sections and in the transfer piece, and were of double-flighted design in barrel sections 1 to 5 and of single-flighted design in barrel section 6 and in the transfer piece. The rotation rate of the corotating twin screws was 490 rpm.

Using the process of the invention, the following throughputs (in each case in kg/h) were achievable in the mixing apparatus of the invention composed of main extruder E1) and of ancillary extruder E2) connected to the main extruder by way of a transfer piece:

|  | A1 | A2 | A3 | Total |
|---|---|---|---|---|
| Experiment 1 | 42.5 | 5.0 | 2.5 | 50 |
| Experiment 2 | 63.75 | 7.5 | 3.75 | 75 |
| Experiment 3 | 68 | 8.00 | 4.0 | 80 |
| Experiment 4 | 85.0 | 10.0 | 5.0 | 100 |

All of the experiments gave extrudates which could be hauled off and were smooth and visually homogeneous (as determined by an optical microscope at a magnification of 266).

COMPARATIVE EXAMPLE

Experiment C1: Experiment C1 was carried out as experiment 1 of the inventive example presented above, but without cooling of the transfer piece. Adequate mixing of the component could not be achieved. Unincorporated component A2 was discharged from the die of the main extruder. The resultant extrudate was inhomogeneous. The product could not be pelletized.

The examples confirm that the inventive mixing apparatus and/or process can prepare homogeneous additive masterbatches from a thermoplastic component, a high-melting-point additive component and another component C2, where the melting point or the decomposition temperature of the other component is well below the temperature which is the lower limit of the thermoforming range of the thermoplastic component, without any problems caused by premature melting of C2 and relating to agglutination or caking during feeding, relating to the pressure build-up needed for the feeding of C2, relating to the mixing of the individual components, or relating to decomposition or discoloration of C2, and without any occurrence of inhomogeneity in the inventive additive masterbatches.

The additive masterbatches obtained were homogeneous and could be used for providing additives to polymers, without dusting, caking, agglutination or abrasion.

What is claimed is:

1. A mixing apparatus comprising
   a first screw-based machine (S1) having a casing with an inner wall surrounding a screw-containing barrel which comprises a plasticizing zone and a homogenizing zone, and having heating equipment at least in the plasticizing and homogenizing zone, and
   a second screw-based machine (S2) having a screw and a screw-containing barrel and an outlet,
   wherein the outlet of S2 is connected to the screw-containing barrel of S1 by a connector which comprises cooling equipment which is effective as far as the inner wall of S1, and
   wherein the screw of S2 is capable of building up a pressure which is sufficiently high to allow that material is conveyed from S2 to S1 against pressure which is exerted within the screw-containing barrel of S1.

2. The mixing apparatus defined in claim 1, wherein the connector connects to the inner wall of the screw-containing barrel of S1 at a connecting point and the temperature of the connector is about 50° C. to 350° C. below the temperature of the inner wall of the screw-containing barrel of S1 in the region of the connecting point.

3. A mixing apparatus defined in claim 2, wherein the temperature of the connector is not above about 60° C. and the temperature of the inner wall of the screw-containing barrel of S1 in the region of the connecting point is above about 110° C.

4. The mixing apparatus defined in claim 1, wherein the screw of S2 extends into the connector and the screw is single-flighted and/or has increasingly closely spaced flights in the region where the material is conveyed from S2 to S1.

* * * * *